United States Patent

Haddad

[11] 4,140,523
[45] Feb. 20, 1979

[54] CHEMICOTHERMAL PRODUCTION OF MAGNESIUM

[75] Inventor: Philip O. Haddad, Alvin, Tex.

[73] Assignee: The Dow Chemical Company, Midland, Mich.

[21] Appl. No.: 855,150

[22] Filed: Nov. 28, 1977

[51] Int. Cl.² ............................................. C22B 45/00
[52] U.S. Cl. .................................... 75/67 R; 75/10 A
[58] Field of Search ............................. 75/10 A, 67 R

[56] References Cited

U.S. PATENT DOCUMENTS 2,396,658  3/1946  Hybinette et al. .................... 75/67 R

FOREIGN PATENT DOCUMENTS 922300  3/1963  United Kingdom.

Primary Examiner—M. J. Andrews
Attorney, Agent, or Firm—W. J. Lee

[57] ABSTRACT

Magnesium metal is produced in a two-stage chemicothermal process employing metallothermic reduction of MgO using Al metal, present in an Al alloy, as the reducing metal in one stage according to the reaction

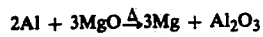

and employing a carbothermic reduction,

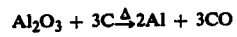

in the other stage to regenerate the Al metal for recycling back to the metallothermic reduction step. The process substantially avoids the reversion reaction, Mg + CO → MgO + C, by separating the formation of Mg from that of CO (carbon monoxide) and does not rely on having to remove slag from the reactors.

12 Claims, 2 Drawing Figures

CHEMICOTHERMAL PRODUCTION OF MAGNESIUM

BACKGROUND OF THE INVENTION

The present invention is in the general field of metallurgy known as pyrometallurgy, meaning that high temperature is employed in obtaining a metal from its compounds.

In the production of metals from metal oxides, reduction by carbon, known as "carbothermal reduction," is well known. Among the carbothermal reduction methods which are well-known are: the high-temperature reaction of carbon with MgO to produce Mg metal and carbon monoxide; and the high-temperature reaction of carbon with $Al_2O_3$ to produce Al metal (in an alloying agent) and carbon monoxide. The back-reaction of CO with molten Al alloy is not a problem, but the back reaction of CO with Mg vapor (which forms MgO) is a problem and is difficult to avoid. Carbothermal reductions are sometimes referred to as "direct reductions."

The term "metallothermic reduction" is widely used in the relevant arts and includes processes whereby a given metal oxide is reduced by another metal. For instance, MgO is reduced at high temperature by a reducing agent such as aluminum, calcium, silicon, or various mixtures of these metals with inert, or less active, metals. In these reactions, where there is no carbon present, the Mg metal is more easily recovered in pure from than when a carbothermal reduction is used which produces equivalent molecular amounts of CO along with the Mg vapor and which gives back-reaction problems as the Mg vapor is cooled and condensed. "Aluminothermic" and "silicothermic" reductions are the most popular of the "metallothermic" reductions.

British Pat. No. 922,300 teaches an indirect reduction of MgO by employing a two-step technique comprising, as the first step, a carbothermic reduction expressed as

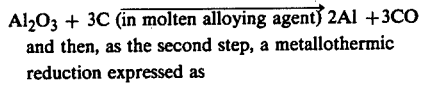

and then, as the second step, a metallothermic reduction expressed as

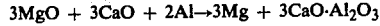

By separating the two steps, contact between hot Mg and CO is substantially avoided, thus the troublesome back-reaction between the two is substantially avoided.

For purposes of conciseness, the term "chemicothermic reduction" or "chemicothermal reduction" is used in this disclosure to mean a two-stage or two-step reaction involving indirect reduction by employing metallothermic reduction of MgO as one stage or step and carbothermic reduction of $Al_2O_3$ as the other stage or step.

SUMMARY OF THE INVENTION

Magnesium is recovered from a two-stage chemicothermal process which comprises, (1) feeding particulate MgO to a Mg-product vessel containing molten $Al_2O_3$ on a molten Al alloy, thereby forming more $Al_2O_3$ slag on the molten Al alloy and releasing Mg as a vapor from the vessel (recovering the Mg elsewhere) while transferring the so-formed $Al_2O_3$ slag, along with some of the Al alloy, to a CO-product vessel in which the Al alloy and $Al_2O_3$ is kept molten, and (2) feeding particulate carbon to the contents of the CO-product vessel, which contains molten Al alloy, thereby obtaining a reaction of the carbon with the $Al_2O_3$ to form carbon monoxide, which is released from the vessel (and recovered elsewhere), and Al metal which recombines with the molten Al alloy. Preferably, molten Al alloy from this CO-product vessel is cycled to the Mg-product vessel while molten $Al_2O_3$ flows from the Mg-product vessel to the CO-product vessel.

DETAILED DESCRIPTION OF THE INVENTION

FIGS. 1, 2, and 3 are provided as visual aids to facilitate description of, and discussion of, the present invention.

FIG. 1 is a general depiction, not to scale, of a two-stage (two-step) process which employs separate vessels for each stage (or step) where MgO is reduced in one vessel by the action of Al, thereby forming $Al_2O_3$ slag on a molten Al alloy, and where the $Al_2O_3$ is reduced, in the other vessel, by the action of carbon, thereby forming CO. Means for cycling the molten ingredients from one vessel to the other is shown.

The FIGS. are discussed in greater detail in the following descriptions, bearing in mind that the two-stage (or two-step) chemicothermal reductions are referring to the steps illustrated empirically by the following equations:

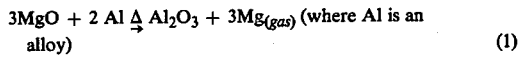
(1)

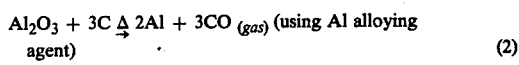
(2)

Figure 1:
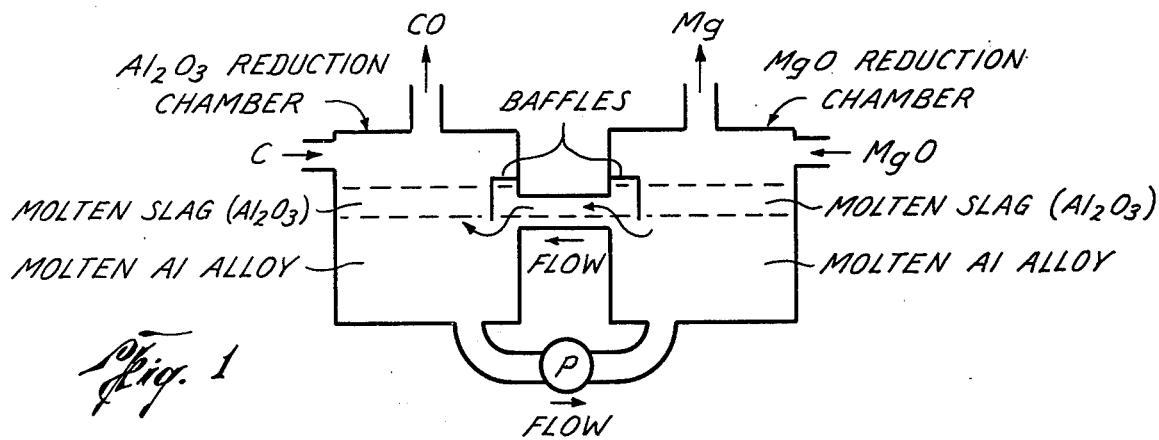
Figure 2:
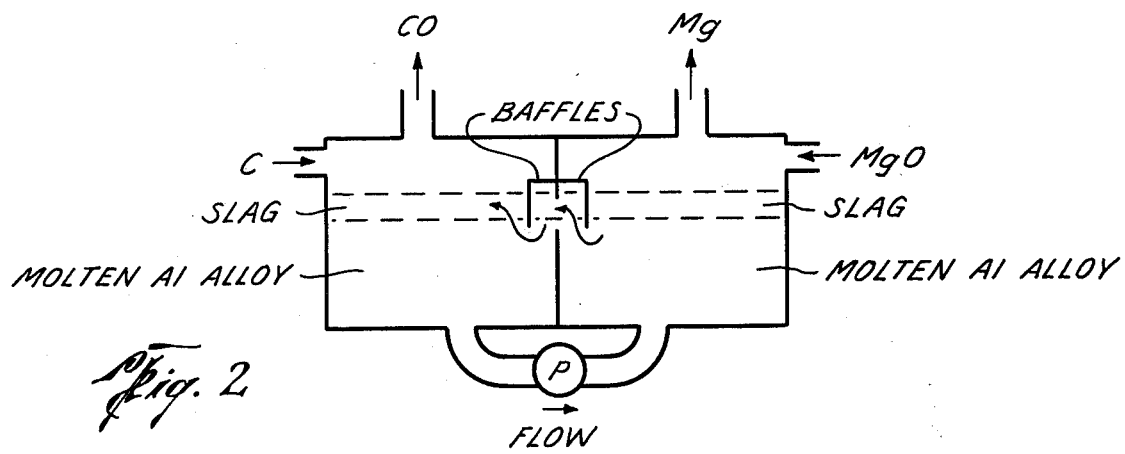
FIG. 2 is a general depiction, not to scale, which is similar to FIG. 1 except that a compartmented vessel is shown wherein the reduction of MgO is done in one compartment and the reduction of $Al_2O_3$ is done in the other compartment.

FIGS. 1 and 2 are helpful in demonstrating pictorially that the evolvement of Mg and CO is done in separate zones or compartments and the Mg and CO are kept separate, thus avoiding the reversion reaction between the two which has been historically troublesome.

In FIG. 1 it is illustrated that MgO is fed to a chamber or compartment containing molten Al alloy and molten $Al_2O_3$ slag with Mg vapor given off, while particulate carbon is fed to a connected chamber or compartment which also contains molten Al alloy and molten $Al_2O_3$ slag where CO is given off. The two chambers are connected by a conduit which permits molten slag/alloy to flow from the MgO-reduction chamber to the $Al_2O_3$-reduction chamber as molten Al alloy is pumped through another conduit from the $Al_2O_3$-reduction chamber to the MgO-reduction chamber. Baffles may be desired (such as illustrated) to substantially avoid any flow of CO or Mg vapor from one chamber to the other.

FIG. 2 is essentially similar to FIG. 1 except that it illustrates that the two chambers or compartments may be contained in a single vessel.

Figure 3:
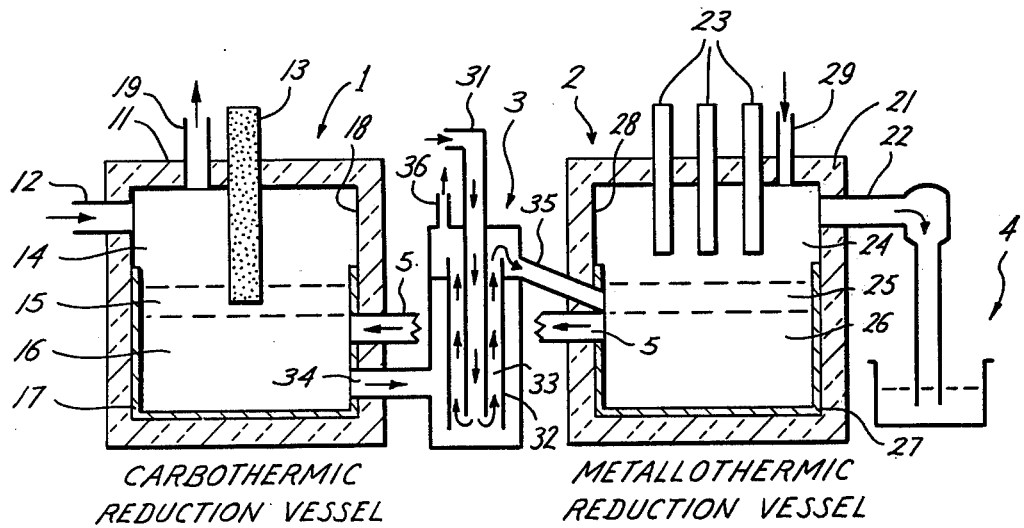
FIG. 3 is a general depiction, not to scale, of equipment useful for practicing the preferred embodiment of the present process and differs from FIG. 1 in that more features are shown and the means for cycling molten ingredients is shown as a gas-lift pump.

The pump means in FIGS. 1 and 2 may be any pump which will effectively survive the rigorous duty of pumping molten Al alloy along with whatever impurities or other ingredients there may be in the alloy. Since one is likely to encounter maintenance problems or excessive wear rates with most mechanical pumps, a gas-lift pump, such as shown in FIG. 3, is preferred. Means for supplying heat are not depicted in FIGS. 1 and 2, nor is insulation means shown.

FIG. 3 demonstrates an embodiment which comprises an insulated $Al_2O_3$-reduction vessel (1), an insulated MgO-reduction vessel (2), a gas-lift pump (3), and a Mg vapor condensation apparatus (4). In vessel (1) there is depicted an insulation layer (11), a conduit (12) for feeding carbon, an electrode (13) for resistance heating, a vapor space (14), a molten $Al_2O_3$-slag layer (15), a molten Al alloy layer (16), a "frozen wall" layer (17), an interior vessel wall (18), and a CO removal conduit (19). In vessel (2) there is depicted an insulation layer (21), a Mg vapor removal conduit (22), means for radiant heating (23), a vapor space (24), a molten $Al_2O_3$ slag layer (25), a molten Al alloy layer (26), a "frozen wall" layer (27) an interior vessel wall (28) and a conduit for feeding MgO (29). Gas-lift pump (3) is connected by conduit (34) to the Al alloy layer of vessel (1) and by conduit (35) to the slag layer of vessel (2) and is operated by forcing an inert gas down through dip-leg (31) which then flows upwardly through an annular conduit (32) which encircles dip-leg (31), creating an annular space (33) through which molten Al alloy is caused to flow from conduit (34) to, and through, conduit (35) into vessel (2). Gas removal conduit (36) may be vented or re-cycled to gas inlet (31). A conduit (5) connects vessel (1) and vessel (2) at about the interface of the slag/alloy in each vessel. The flow through conduit (34) is taken from a point below the interface of slag (15) and alloy (16) and the flow from conduit (35) enters vessel (2) at, or near, the top of slag layer (25); in this way, the MgO feed comes into contact with Al alloy portion which is high in Al content. The slag/alloy interface in vessel (2) is at about the same level as conduit (5). Conduit (5) may be constructed so as to have the entry into vessel (1) lower than the exit from vessel (2) or may be substantially horizontal as depicted.

Even though the heating means for the reductions taking place in the vessels are shown in FIG. 3 as being slag-resistance heating in vessel (1) and radiant heating in vessel (2), radiant heating may be used in each vessel. Slag-resistance heating, using a carbon or graphite electrode, is likely to introduce carbon into the reaction and this carbon is accomodated quite easily in vessel (1) since carbon is a feed to the reaction. However, it slag-resistance heating is employed in vessel (2), it is recommended that an extended arc electrode be used so as not to introduce carbon to the reaction as this would reduce the efficiency of the Mg production. It is not required in the present invention, as it is in electrolytic reduction processes, to convert alternating current to direct current in order to provide energy for heating.

The "frozen wall" depicted in FIG. 3 may be formed by the temperature gradient which is consequence of heat loss through the inner wall of the vessels, even though there is insulation provided. Heat losses through the vessel walls cause "freezing" of a layer of the molten material on the walls and this is beneficial as it protects the inner vessel wall from attack by the molten material. The use of "frozen walls" is a technique known in the art and may be used with metal vessels, graphite vessels or refractory vessels. The use of "frozen walls" to protect the vessels in such rigorous service is generally preferred over the use of very expensive or exotic materials of construction which may be employed to withstand the rigorous service for extended periods of time.

It is recommended that in the vessels of FIGS. 1, 2, and 3 that means be provided for draining part, or all, of the molten ingredients from the system. In case of a breakdown in the heating system, or in case there is a build-up of sludge impurities in the vessels, it may be desired to withdraw all, or at least part, of the molten ingredients to avoid complications. Such drain means are not shown in the drawings. Also not shown in the drawings is a feed means for introducing an inert gas purge which may be desired to exclude air, moisture, or other detrimental materials. It is within the skill of practitioners of the relevant arts to provide drain means, inlet means, temperature-measuring devices, and other physical features as may be necessary or desired in the construction of the vessels.

The Mg vapor condensing means (4) in FIG. 3 may by any of the means known in the relevant arts for cooling Mg vapor to a liquid or to a solid. In the present invention, the substantial absence of CO in the Mg vapor is a principal feature and allows easy and efficient cooling of the Mg vapor without the historically troublesome back-reaction of Mg with CO.

In contrast to some of the pyrometallurgy processes suggested in the past, the present invention does not require adjustments of the pressure in the reaction vessels, and ambient pressure is advantageously employed.

The MgO feed

The MgO used in the process should be as pure and free from impurities as is economically feasible. Relatively pure MgO may be prepared by known techniques, such as calcining of Mg hydrate, Mg carbonate, or ores having a high ratio of MgO is impurities. The present process, while intended to be operated without formation of a slag-discard, may tolerate a relatively small amount of impurities coming in with the MgO, the carbon, or the Al metal. If such impurities in the system build up to a significant level, it may be necessary to drain off enough of the slag and/or the molten Al alloy to maintain the impurities at the desired level. A make-up amount of Al alloy and/or $Al_2O_3$ may be added to replenish the volume drained from the system.

The Carbon feed

The carbon employed in the carbothermic reduction of $Al_2O_3$ may be, e.g., coke, graphite, or any other conveniently available particulate carbon. Preferably an inexpensive, readily available form of carbon which is low in impurities or ash content should be used. The carbon should be of a particle size large enough that it will not be easily entrained in the off-gasses from the vessels.

The Al alloy

The Al alloy used in the present process may be any alloy of Al with one or more metals and where the boiling point of the alloy is higher than the temperature at which the process is operated. The amount of Al by weight in the alloy should be at least about 10%, preferably at least about 15%, but generally not more than 75%, preferably not more than about 45%. If there is too little Al in the alloy, the efficiency of the MgO reduction step is diminished. If there is too much Al in the alloy, there is an increased risk that solid $Al_4C_3$ will form and some of the $Al_2O_3$, when reacted with carbon, will form fumed alumina, as aluminum suboxide, and become expelled from the reactor rather than being returned as Al to the Al alloy. By employing Al alloys having less than about 75% Al, the Al losses are somewhat reduced, as compared to 100% Al, and by employing Al alloys having not more than about 45% Al, and Al losses are substantially reduced.

Among the Al alloys which are within the purview of this invention are, e.g., Al alloyed with at least one of the group consisting of Cu, Si, Fe, Sn, Ni, Co, and Cr. Preferably Cu, Si and/or Fe, is the alloying metal.

During the operation of the process, the amount of Al in the alloy in the MgO reduction zone will be less than the amount of Al in the alloy in the $Al_2O_3$ reduction zone. Thus where the Al content of the Al alloy is about, say, 30–45% in the zone where reduced Al, from the $Al_2O_3$ reduction, is returned to the alloy, the amount of Al in the alloy in the MgO reduction zone, where $Al_2O_3$ is formed, may be about 10–15%.

The temperature employed in the CO-production vessel may be, in the range of about 1850°–2300° C., preferably about 1950°–2100° C. The temperature in the Mg-production vessel may be in the range of about 2000°–2300° C., preferably about 2030°–2100° C. Within these ranges one may keep the Al alloy and $Al_2O_3$ molten, assure easy solution of MgO in the $Al_2O_3$, assure easy solution of the carbon in the $Al_2O_3$, and assure appreciable reaction rates, yet not encounter significant vaporization of the alloy and slag. At lower temperatures one may encounter decreased reaction rates and solidification of alloy and/or slag components. At higher temperatures one is likely to encounter excessive vaporization of the molten ingredients. The reactions are endothermic and, generally the $Al_2O_3$-reduction requires about 60% of the total heat input whereas the MgO-reduction requires about 40% of the total heat input to drive the reactions at a steady pace at which the Mg and CO are produced in molecularly equivalent quantities.

The inert gas blanket maintained in the MgO reduction vessel, to exclude air, oxygen, and water, may be, e.g., argon, helium, neon, or hydrogen. These same inert gases may also be employed in gas-lift pumps for causing molten slag and/or molten metal to flow from one vessel to another.

OPERATION OF PROCESS IN GENERAL

In beginning the process, the molten Al alloy is generally provided first in the process vessels. This may be done by providing the alloy ingredients separately and melting them together or by melting one of them and then dissolving or co-melting the other one(s) in the first one. Some of the readily available scrap Al or Al alloys are ideally suited for use in the present invention. The initial charge of $Al_2O_3$ may be formed in-situ by reacting MgO with the molten Al alloy, but some time can be saved if the $Al_2O_3$ is charged into the MgO-reduction vessel.

The MgO is fed to, and dissolves in, the molten $Al_2O_3$ where it combines with Al of the Al alloy which is in contact with the layer of $Al_2O_3$. This release Mg vapor and forms more $Al_2O_3$.

The $Al_2O_3$ layer, along with Al alloy, is conveyed to the $Al_2O_3$ reduction chamber where it is contacted with carbon, thereby forming CO and Al metal. The Al metal recombines with the Al alloy. Any residual MgO in the $Al_2O_3$ slag layer is also reduced by carbon, thus some Mg vapor may come off with the CO.

In both of the reduction chambers in the process, the $Al_2O_3$ slag, and any other metal oxide slag ingredients which may be present, have less specific gravity than the Al alloy; thus the slag tends to float to the top, but the interface between the Al alloy and the top slag layer is a mixture of molten alloy and molten slag. Some agitation of this layer of Al alloy/slag is caused by the evolution of Mg vapor in chamber and by evolution of CO in the other. This agitation is helpful in dissolving the incoming MgO in the one chamber and incoming carbon in the other.

The molten Al alloy from the $Al_2O_3$-reduction chamber may be, and preferably is, cycled to the MgO-reduction chamber. Alternatively, it is within the purview and the capabilities, of the present invention, to supply molten Al alloy from one source to the MgO-reduction chamber while conveying molten Al alloy from the $Al_2O_3$-reduction chamber to some other usage. In either case, the process of the present invention may be operated continuously or intermittently for the production of Mg vapor. Where the pincipal goal of the process is to reduce MgO to Mg vapor, not the goal of employing Al scrap metal, it is preferred to re-cycle the Al alloy directly back to the MgO-reduction chamber.

Having learned of the present invention from this disclosure, it will become apparent to persons skilled in the pertinent arts that a substantially steady state continuous operation may be attained by providing feed rates of MgO and carbon which will cause the formation of $Al_2O_3$ in one chamber at the same rate as the reduction of $Al_2O_3$ in the other chamber.

The length of time for which one may operate the present process continuously without interruptions or without tapping off ingredients will depend to some extent on the kind and amount of impurities entering the system with the MgO and/or carbon. One of the principal impurities often found in MgO is CaO which, while sometimes being beneficial in "starting" the MgO-reduction by the action of molten Al (as alloy) where there is no $Al_2O_3$ provided initially, is likely to build up in the $Al_2O_3$-reduction chamber until it either is drained off, or is allowed to reach a concentration in the $Al_2O_3$ slag at which it commences to form appreciable amounts of Ca vapor and is evolved along with the CO. Some carbides are formed in the $Al_2O_3$-reduction chamber and, to the extent they are carried by the molten Al alloy to the MgO-reduction chamber, are detrimental and reduce the efficiency of the Mg collection step. The tendency for carbides to form in the alloy is directly related to the carbon dissolved in the alloy and to the percent Al in the alloy. The solubility of carbon in the Al alloy is in proportion to the Al concentration and is also dependent to a lesser degree on the temperature of the molten Al alloy.

EXAMPLE

In an apparatus such as depicted by FIG. 3, a molten-Al-Cu alloy is provided in both compartments and a molten $Al_2O_3$ slag layer is provided on the molten Al-Cu alloy. An inert gas purge (argon) is used initially to sweep out the air and moisture and MgO is fed to the molten $Al_2O_3$ slag in the MgO-reduction vessel where it dissolves. The temperature of the molten mixture in each vessel is maintained in the range of about 2000° to about 2100° C. The MgO-reduction chamber and the $Al_2O_3$-reduction chamber are each allowed to form a "frozen wall" as a protective liner. The protective liner in each vessel extends to at least the top of the molten slag layer. Granular coke is fed to the $Al_2O_3$-reduction chamber where it dissolves and reacts. The gas-lift pump is operated by argon to cause flow of Al-Cu alloy from the $Al_2O_3$-reduction vessel to the MgO-reduction vessel. This causes the molten slag, mixed with Al-Cu alloy, to flow from the MgO-reduction chamber to the $Al_2O_3$-reduction chamber as the liquid seeks its own level in the two chambers. In the $Al_2O_3$-reduction chamber, the carbon (coke) reduces the $Al_2O_3$ to form Al metal, which recombines with the Al-Cu alloy, and CO which is removed from the chamber. Simultaneously, MgO is reduced by Al in the MgO-reduction chamber, thereby forming $Al_2O_3$, and Mg vapor is removed from the chamber. The following amounts and ratios, all by weights, illustrate the feed and product:

(a) %Al in Al-Cu alloy is from a high of about 45% in the alloy pumped from the $Al_2O_3$-reduction chamber to the MgO-reduction chamber to a low of about 10% in the alloy which accompanies the $Al_2O_3$ back to the $Al_2O_3$-reduction chamber:

(b) MgO feed/alloy in the MgO-reduction chamber of about 0.05/1.0 to about 1.0/1.0;

(c) Carbon feed/$Al_2O_3$ slag in the $Al_2O_3$-reduction chamber of about 0.35/1.0 to about 0.4/1.0;

(d) Parts Mg produced/parts MgO feed is about 0.5 to 0.6;

(e) Parts CO produced/parts C fed is about 2.33;

(f) % impurities in the starting Al-Cu alloy is less than about 1%;

(g) % impurities in the MgO fed is in less than about 2%;

(h) % impurities in the coke fed in less than about 1%;

(i) $Al_2O_3$/alloy in the $Al_2O_3$-reduction chamber at the start is about 0.5/1.0;

(j) $Al_2O_3$/alloy in the MgO-reduction chamber at the start about 0.2/1.0;

(k) The wt. % of the carbon dissolved in the Al alloy ranges from less than 0.1% in a 10% Al alloy to about 0.7% in a 45% Al alloy at temperatures of operation.

The CO evolved from the $Al_2O_3$-reduction is collected and may be used as a fuel or other purpose. The Mg vapor envolved from the MgO-reduction is collected in the absence of significant quantities of reactive impurities (e.g. air or moisture) and is condensed by cooling.

I claim:

1. A chemicothermal process for producing Mg metal from MgO, said process comrising feeding particulate MgO to a MgO-reduction vessel containing molten Al alloy, thereby forming a molten $Al_2O_3$ slag on the molten Al alloy and releasing Mg metal as a vapor from the vessel, transferring the so-formed $Al_2O_3$ slag, along with some of the used molten Al alloy, to an $Al_2O_3$-reduction vessel in which the Al alloy is kept molten, feeding particulate carbon to the contents of the $Al_2O_3$-reduction vessel, thereby reacting it with the $Al_2O_3$ to form CO, which is released from the vessel, and Al metal which recombines with the molten Al alloy which is cycled to the MgO-reduction vessel, wherein the temperature in the MgO-reduction vessel is maintained in the range of about 2000° to about 2300° C. and the temperature in the $Al_2O_3$-reduction vessel is in the range of about 1850° to about 2300° C.

2. The process of claim 1 wherein the process is run continuously by cycling the molten Al alloy from the $Al_2O_3$-reduction vessel back to the MgO-reduction vessel while feeding requisite amounts of MgO to the MgO-reduction vessel and carbon to the $Al_2O_3$-reduction vessel and continuously removing Mg vapor from the MgO-reduction vessel and CO from the $Al_2O_3$-reduction vessel.

3. The process of claim 1 wherein the temperature of the molten Al alloy and slag in the MgO-reduction vessel is in the range of about 2030° to about 2100° C. and the temperature in the $Al_2O_3$-reduction vessel is in the range of about 1950° to about 2100° C.

4. The process of claim 1 wherein the ratio of $Al_2O_3$/Al alloy going from the MgO-reduction vessel to the $Al_2O_3$-reduction vessel is in the range of about 0.04 to about 5.0.

5. The process of claim 1 wherein the cycling of molten Al alloy from the $Al_2O_3$-reduction vessel to the MgO-reduction vessel is performed by using a gas-lift pump to lift molten Al alloy from beneath the slag layer in the $Al_2O_3$-reduction vessel into the slag layer in the MgO-reduction vessel.

6. The process of claim 1 wherein an inert gas atmosphere is employed in the MgO-reduction vessel to exclude air and moisture.

7. The process of claim 2 wherein the weight ratio of MgO/Al alloy being fed into the MgO-reduction vessel is in the range of about 0.5 to about 1.0, and the weight ratio of carbon/$Al_2O_3$ being fed into the $Al_2O_3$-reduction vessel, is in the range of about 0.35 to about 0.4.

8. The process of claim 1 wherein the molten Al alloy contains at least about 10% Al by weight alloyed with at least one metal selected from the group consisting of Cu, Si, Fe, Sn, Ni, Co, and Cr.

9. The process of claim 8 wherein the molten Al alloy is an Al-Cu alloy having a weight ratio of Al in the range of about 10% to about 75%.

10. The process of claim 9 wherein the Al alloy contains about 10% to about 45% Al by weight.

11. A chemicothermal process for producing Mg metal from MgO, said process comprising feeding particulate MgO to a MgO-reduction vessel containing molten Al alloy at a temperature of about 2000° to about 2300° C., thereby forming a molten $Al_2O_3$ slag on the molten Al alloy and releasing Mg metal as a vapor from the vessel, transfering the so-formed $Al_2O_3$ slag to an $Al_2O_3$-reduction vessel in which an Al alloy is kept molten at a temperature of about 1850° to about 2300° C., and feeding particulate carbon to the contents of the $Al_2O_3$-reduction vessel, thereby reacting it with the $Al_2O_3$ to form CO, which is released from the vessel, and Al metal which combines with the molten Al alloy.

12. The process of claim 11 wherein the content of the Al in the Al alloy in the MgO-reduction vessel is maintained in the range of about 10% to about 75% by adding make-up Al at a rate commensurate with the amount of Al leaving the MgO-reduction vessel as $Al_2O_3$, and wherein the content of the Al in the Al alloy in the $Al_2O_3$-reduction vessel is maintained in the range of about 10% to about 45% by withdrawing Al alloy at a rate commensurate with the amount of Al being formed from $Al_2O_3$ and by adding a make-up amount of alloying agent to replace that which is removed as Al alloy.

* * * * *

UNITED STATES PATENT AND TRADEMARK OFFICE
CERTIFICATE OF CORRECTION

PATENT NO. : 4,140,523

DATED : February 20, 1979

INVENTOR(S) : Philip O. Haddad

It is certified that error appears in the above-identified patent and that said Letters Patent are hereby corrected as shown below:

Col. 1, line 30; change "from" to --form--.

Col. 3, line 49; change "it" to --if--.

Col. 3, line 58; insert --a-- between "is" and "consequence".

Col. 4, line 20; change "by" to --be--.

Col. 4, line 36; change "is" to --to--.

Col. 5, line 7; change "and" to --the--.

Col. 5, line 21; change "be," to --be--.

Col. 5, line 34; change "generally" to --generally,--.

Col. 5, line 61; change "release" to --releases--.

Col. 6, line 8; insert --one-- between "in" and "chamber".

Col. 6, line 21; change "pincipal" to --principal--.

Col. 6, line 57; change "molten-" to --molten--.

Col. 7, line 1; change "$Al_{203}$" to --$Al_2O_3$--.

UNITED STATES PATENT AND TRADEMARK OFFICE
CERTIFICATE OF CORRECTION

PATENT NO. : 4,140,523
DATED : February 20, 1979
INVENTOR(S) : Philip O. Haddad

It is certified that error appears in the above-identified patent and that said Letters Patent are hereby corrected as shown below:

Col. 7, line 42; change "envolved" to --evolved--.

Col. 7, line 48; change "comrising" to --comprising--.

Signed and Sealed this

Tenth Day of July 1979

[SEAL]

Attest:

LUTRELLE F. PARKER
Attesting Officer     Acting Commissioner of Patents and Trademarks